US011590792B2

(12) United States Patent
Choe et al.

(10) Patent No.: US 11,590,792 B2
(45) Date of Patent: Feb. 28, 2023

(54) SECURITY DEVICE USING LIGHT REFLECTION PROPERTY

(71) Applicant: KOREA MINTING, SECURITY PRINTING & ID CARD OPERATING CORP., Daejeon (KR)

(72) Inventors: Won Gyun Choe, Daejeon (KR); Su Dong Kim, Daejeon (KR); Hong Keon Kim, Daejeon (KR); Hyun Soo Kim, Daejeon (KR); E Den Kim, Daejeon (KR); Hye Jun Choi, Daejeon (KR)

(73) Assignee: KOREA MINTING, SECURITY PRINTING & ID CARD OPERATING CORP., Daejeon (KR)

(*) Notice: Subject to any disclaimer, the term of this patent is extended or adjusted under 35 U.S.C. 154(b) by 0 days.

(21) Appl. No.: 17/278,253

(22) PCT Filed: Aug. 27, 2019

(86) PCT No.: PCT/KR2019/010924
§ 371 (c)(1),
(2) Date: Mar. 19, 2021

(87) PCT Pub. No.: WO2020/080668
PCT Pub. Date: Apr. 23, 2020

(65) Prior Publication Data

US 2021/0354496 A1 Nov. 18, 2021

(30) Foreign Application Priority Data

Oct. 17, 2018 (KR) ........................ 10-2018-0123714

(51) Int. Cl.
*B42D 25/378* (2014.01)
*B42D 25/373* (2014.01)
(Continued)

(52) U.S. Cl.
CPC ............ *B42D 25/378* (2014.10); *B42D 25/41* (2014.10)

(58) Field of Classification Search
CPC .. B42D 25/378; B42D 25/373; B42D 25/364; G02B 5/285; G02B 5/28
(Continued)

(56) References Cited

U.S. PATENT DOCUMENTS 4,707,593 A 11/1987 Murata et al.
2007/0196571 A1 8/2007 Ozin et al.
(Continued)

FOREIGN PATENT DOCUMENTS

CN 104136229 A 11/2014
GB 2 176 746 A 1/1987
(Continued)

OTHER PUBLICATIONS

The Extended European Search Report for European Patent Application No. 19872315.7, dated Sep. 29, 2022.

*Primary Examiner* — Justin V Lewis

(57) ABSTRACT

The present invention relates to a security device comprising a colloidal crystal which exhibits excellent visibility and is also easily manufactured. The security device, according to the present invention, comprises: a substrate; a groove part formed on the substrate; a colloidal crystal positioned in the groove part; and an aging film. The security device, according to the present invention, exhibits excellent security and visibility, and thus may be used for securities, credit cards, security cards, anti-forgery products, etc.

9 Claims, 4 Drawing Sheets

(51) Int. Cl.
*B42D 25/364* (2014.01)
*G02B 5/28* (2006.01)
*B42D 25/41* (2014.01)

(58) Field of Classification Search
USPC ........................ 283/72, 74, 94, 98, 100, 901
See application file for complete search history.

(56) References Cited

U.S. PATENT DOCUMENTS

| | | | | |
|---|---|---|---|---|
| 2010/0150511 | A1* | 6/2010 | Arsenault | B82Y 20/00 522/182 |
| 2010/0253061 | A1 | 10/2010 | Whiteman | |
| 2011/0242463 | A1 | 10/2011 | Park et al. | |
| 2014/0239628 | A1 | 8/2014 | MacPherson et al. | |
| 2015/0076808 | A1 | 3/2015 | Kim et al. | |
| 2015/0233876 | A1* | 8/2015 | Dellea | B05D 1/005 427/535 |

FOREIGN PATENT DOCUMENTS

| | | | |
|---|---|---|---|
| JP | S61-273786 | A | 12/1986 |
| JP | S6443826 | A | 2/1989 |
| JP | 2008126475 | A | 6/2008 |
| JP | 2010036393 | A | 2/2010 |
| JP | 2012-201755 | A | 10/2012 |
| JP | 2014-534088 | A | 12/2014 |
| KR | 1993-0007557 | B1 | 8/1993 |
| KR | 10-0247850 | B1 | 6/2000 |
| KR | 20100085979 | A | 7/2010 |
| KR | 10-2011-0093145 | A | 8/2011 |
| KR | 20110109443 | A | 10/2011 |
| KR | 20150031862 | A | 3/2015 |
| KR | 10-2017-0124763 | A | 11/2017 |
| WO | WO2010119248 | A2 | 10/2010 |
| WO | 2013/089537 | A1 | 6/2013 |
| WO | 2018/142127 | A1 | 8/2018 |

* cited by examiner

SECURITY DEVICE USING LIGHT REFLECTION PROPERTY

TECHNICAL FIELD

The present disclosure relates to a security device in which a colloidal crystal is formed in groove portions of a substrate and an aging film is disposed on the substrate with the colloidal crystals formed therein and, specifically, to a security product which is difficult to duplicate due to excellent visibility and security thereof.

BACKGROUND ART

A colloid refers to particles homogeneously dispersed in a particular solvent, and a colloidal crystal refers to a matter in which a matrix and monodisperse particles having different refractive indices are regularly arranged by self-assembly or the like to form a crystal lattice and which exhibits unique optical characteristics depending on geometric properties of unit particles.

A colloidal crystal is manufactured by a gravity precipitation method using precipitation, a two-dimensional monolayer manufacturing method in which a two-dimensional crystal monolayer is formed by evaporation, a three-dimensional self-assembly method in which a regular arrangement among particles is created by controlling colloidal conditions, an induction assembly method in which a three-dimensional structure is made by moving and arranging particles through external force, such as static electricity or magnetic force, and the like.

Regular arrangement of colloidal particles exhibit reflection colors by the same principle and the reflection colors correspond to optical band gaps of colloidal crystals. The reflection colors of colloidal crystals are determined by refractive indices of colloidal and matrix materials, a crystal structure, a particle size, a space between particles, or the like. Therefore, such factors can be controlled to manufacture colloidal crystals having desired reflection colors.

Meanwhile, an attempt has been made to form a thin colloidal crystal to lead to a film form, but adhering a colloidal crystal to a substrate was difficult, and various attempts have been made to form a colloidal crystal on a substrate, but the time for self-assembly was taken long and the colloidal crystal was not uniformly formed.

The induction assembly method has an advantage in that the time for colloidal crystallization can be shortened compared with the self-assembly method, but has problems in that processes and manufacturing apparatuses were complicated and the types of colloidal particle materials were severely constrained.

Moreover, colloidal crystals had limitations in application to products, such as bills and security documents, which require flexibility since the colloidal crystals are difficult to transform.

Therefore, there is a need to develop a film containing a colloidal crystal, for which the manufacturing method is simple compared with conventional methods and which facilitates repetitive production.

DISCLOSURE

Technical Problem

A technical object of the present disclosure is to provide a security device using a colloidal crystal, which has excellent light reflection properties while attaining a simple manufacturing process and structure.

Technical Solution

In accordance with one technical object of the present disclosure, a security device using light reflection properties is provided, and the security device comprises: a substrate including groove portions in at least one surface; a colloidal crystal contained in at least a portion of each of the groove portions; and an aging film covering at least a portion of the colloidal crystal-containing surface of the substrate.

The substrate may comprise at least one selected from a thermoplastic resin and an ultraviolet-curable resin.

The thermoplastic resin may be at least one selected from acetals, fluorocarbons, polyimides, polycarbonates, polyesters, polyethylene, polyacrylates, polystyrenes, polypropylenes, and polyvinyl alcohols.

The ultraviolet-curable resin may be at least one selected from unsaturated polyester resins, polyester acrylate resins, polyurethane acrylate resins, and epoxy acrylate resins.

The substrate may be a flexible substrate.

The colloidal crystal may include spherical particles having a composition of at least one selected from silica, titanium dioxide, polystyrenes, and polymethacrylates and having a monodispersity of 7% or less, and the spherical particles may have an average particle size of 50-300 nm.

The aging film may have a thickness of 10-300 μm.

The aging film may include a hidden image.

The space between neighboring groove portions may be 0.1 μm to 50 mm and the depth of the groove portion may be 10-200 μm.

The shape of the groove portions formed in the upper portion of the substrate may be the same as that of the groove portions formed in the lower portion of the substrate.

The shape of the groove portions formed in the upper portion of the substrate may be different from that of the groove portions formed in the lower portion of the substrate.

The aging film may be a release film which is easy to separate from a thermoplastic resin film and the colloidal crystal.

Advantageous Effects

The security device of the present disclosure can facilitate the formation of a colloidal crystal with uniform quality, compared with conventional devices, and can be utilized as a security element for cards, securities, and the like when a flexible substrate is used. Furthermore, the security device of the present disclosure can be easily manufactured and subjected to a continuous process, thereby reducing the manufacturing cost.

MODE FOR DISCLOSURE

Hereinafter, the present disclosure will be described in more detail with reference to drawings.

The accompanying drawings correspond to merely embodiments shown to illustrate technical scope of the present disclosure in more detail, and thus the scope of the present disclosure is not limited to the accompanying drawings. For the same reason, some elements are exaggerated, omitted, or simplified in the accompanying drawings.

Figure 1:
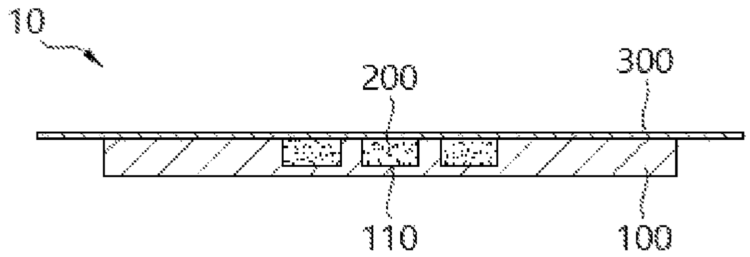
FIG. 1 shows a vertical section of a security device according to an embodiment of the present disclosure.

FIG. 1 shows a vertical section of a security device 10 according to an embodiment of the present disclosure. The security device 10 comprises a substrate 100, a colloidal crystal 200, and an aging film 300, and the colloidal crystal 200 is contained in groove portions 110 formed in the substrate 100. The aging film 300 enables the colloidal crystal 200 to be quickly, stably, and uniformly self-assembled, and also serves to protect the colloidal crystal 200. Therefore, the colloidal crystal 200 is preferably disposed in the groove portions 110, which are spaces between the substrate 100 and the aging film 300, so as to be blocked from the outside by the colloidal crystal 200 and the substrate 100.

The substrate 100 contains at least one selected from a thermoplastic resin and an ultraviolet-curable resin. The groove portions 110 may be easily formed by heat pressing of a mold when the substrate is a thermoplastic resin or by curing through ultraviolet light when the substrate contains an ultraviolet-curable resin.

The thermoplastic resin is preferably at least one selected from acetals, fluorocarbons, polyimides, polycarbonates, polyesters, polyethylene, polyacrylates, polystyrenes, polypropylene, and polyvinyl alcohols, and more preferably at least one selected from polyacryl(methyl methacrylate) (PMMA), acrylonitrile-butadiene-styrene copolymer (ABS), polyethylene terephthalate (PET), glycol-modified polyethylene terephthalate (PETG), thermoplastic polyurethane (TPU), and polyvinyl chloride (PVC).

The ultraviolet-curable resin is preferably at least one of unsaturated polyester resins, polyester acrylate resins, polyurethane acrylate resins, and epoxy acrylate resins, which have a double bond. More preferably, the ultraviolet-curable resin may be a glycol-based acrylate, and at least one selected from polypropylene glycol acrylate, polypropylene glycol dimethacrylate, polyethylene glycol diacrylate, and polyethylene glycol dimethacrylate is favorable.

Especially, the thermoplastic resin facilitates the formation of fine patterns through imprinting, and stably maintains a shape after mold formation, and thus, is advantageous in keeping uniform light reflection properties of colloidal crystals. The thermoplastic resin, when flexible, not only enables a continuous process, but also gives flexibility to final products and thus can be applied to products requiring flexibility, such as securities and cards. In addition, the thermoplastic resin contributes to the enhancement of durability of final products by protecting patterns with colloidal crystals from external impact.

The ultraviolet-curable resin enhances the binding strength with colloidal crystals, and promotes the self-assembly of a colloid to help an aging process. In addition, the use of the ultraviolet-curable resin coated on a thermoplastic resin facilitates the formation of fine patterns and improves process efficiency.

The groove portions 110 are formed in at least one portion of the substrate, and various forms of groove portions can be formed by etching, excavation, imprinting, and the like, but imprinting through heat pressing is preferable for a continuous process. A substrate including groove portions 110, which have already been formed in a substrate manufacturing process, may also be used. When the substrate 100 is formed of a thermoplastic resin, such a substrate is advantageous since the substrate can undergo a continuous process through imprinting.

The space between adjacent groove portions 110 is preferably in the range of 0.1 μm to 50 mm, and the depth of the groove portions 110 is preferably in the range of 10-200 μm. If the space between the groove portions is smaller than 0.1 μm, the molding of the groove portions through a mold is difficult due to the narrow space between groove portions, and maintaining the shape of groove portions is difficult and thus causes a lot of problems in a subsequent process. If the space between the groove portions is larger than 50 mm, visibility is poor.

If the depth of the groove portions is smaller than 10 μm, the depth of a colloidal crystal layer exhibiting a reflection color is small and thus the amount of light reflected is small, so that the reflection light is not clearly expressed. If the depth of the groove portions is larger than 200 μm, the expression of the reflection light may be sufficient, but the time while the colloidal crystal is filled in the groove portions and the time of self-assembly are taken long, so that a lot of time is needed in forming the colloidal crystal.

The size of the groove portions each is preferably 10 μm to 20 mm in both length and width when viewed from the top of the substrate. When viewed from the top of the substrate, the groove portions may have polygonal shapes, such as a triangular shape and a square shape, and may have a circular or oval shape. In consideration of an imprinting process or visibility, a square shape is preferable. The sectional shape of the groove portions in the substrate is preferably a square shape or a triangular shape. The planar size of the groove portions in the surface of the substrate is preferably equal to or larger than the planar size of the groove portions in the bottom surface of the substrate.

According to an embodiment of the present disclosure, the security device 10 preferably has an appropriate thickness range in terms of securing excellent flexibility, and specifically, for example, the security device 10 may have a thickness of 30-500 μm. Within such a range, the security device 10 can have high reflectance and secure excellent flexibility. The thickness of the security device 10 may be more preferably 30-150 μm, and more favorably 50-100 μm.

Figure 2A:
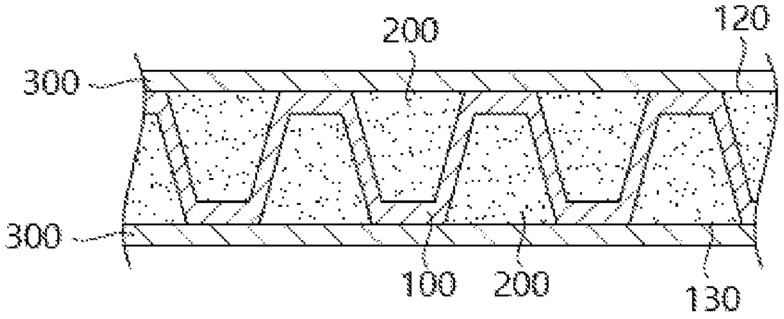
FIG. 2A show a vertical section of a security device according to another embodiment of the present disclosure.
Figure 2B:
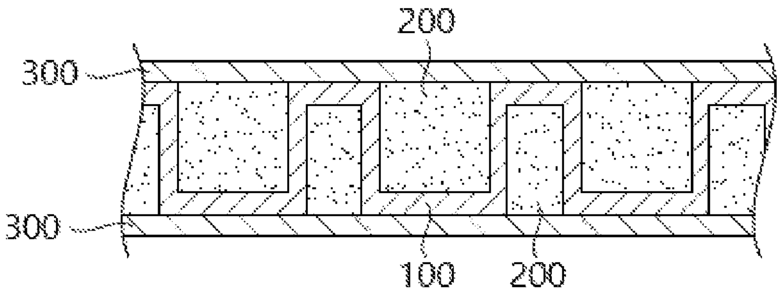
FIG. 2B shows a vertical section of a security device according to still another embodiment of the present disclosure.

As shown in FIGS. 2A and 2B, groove portions 110 may be included in only one of both surfaces of a substrate 100 or may be included in both surfaces of the substrate 100. When the groove portions 110 are formed in both surfaces of the substrate 100, the shape of groove portions formed in a first surface 120 may be the same as the shape of groove portions formed in a second surface 130 (FIG. 2A), and the shape of groove portions formed in a first surface 120 may be different from the shape of groove portions in a second surface 130 (FIG. 2B). The shape of the groove portions may be selected according to the characteristics of products and images to be applied.

Although not shown, the colloidal crystal 200 is typically composed of colloidal particles and a matrix compound. The colloidal particles form a colloidal crystal through a regular arrangement. The colloidal particles used herein are preferably monodisperse spherical particles for a regular arrangement. The average size of colloidal particles was preferably 50-300 nm. If the average size of colloidal particles is smaller than 50 nm, approximately 10% of a colloid is needed to express a reflection color of the visible light region, and in such a case, the colloidal particles are difficult to regularly arrange due to a wide space therebetween. Moreover, there is also difficulty in manufacturing monodisperse particles of 50 nm or less. The repulsion between particles is not uniform, which cause difficulty in the regular arrangement by self-assembly. If the size of the particles is larger than 300 nm, the manufacturing of monodisperse particles is not difficult, but 50% or more of a colloid is needed to express a reflection light of the visible light region, and the viscosity is too high, which causes difficulty in the self-assembly, and the process is difficult to control.

The monodisperse spherical particles used for colloidal crystals are not particularly limited so long as the monodisperse spherical particles are commonly used in the art. The colloidal particles are dispersed in the matrix to form a crystal lattice structure. Specifically, for example, the colloidal particles may be one or more selected from metal nanoparticles, metal oxide nanoparticles, organic nanoparticles, carbon structure nanoparticles, and the like. More specifically, the metal nanoparticles may be any one selected from gold (Au), silver (Ag), copper (Cu), nickel (Ni), zinc (Zn), aluminum (Al), tin (Sn), palladium (Pd), platinum (Pt), silicon (S), and the like, or a mixture thereof or an alloy thereof, and the metal oxide nanoparticles may be oxides of the metal nanoparticles. The organic nanoparticles may be one or more polymer nanoparticles selected from polyethylene, polypropylene, polyacrylates, polymethylmethacrylate, polystyrenes, polydimethylsiloxane, polyimides, polyethylene terephthalate, polyethylene naphthalate, polyethersulfones, polycarbonates, and the like, and the carbon structure nanoparticles may be graphite or the like.

Preferably, the carbon structure nanoparticles may be formed of a composition of at least one selected from silica, titanium dioxide, polystyrenes, and polymethacrylates, and the carbon structure nanoparticles facilitate the formation of monodisperse spherical nanoparticles and the formation of colloidal crystals and are comparatively excellent in durability. Silica particles were most preferable.

The matrix compound in the present disclosure contains a multifunctional compound and a photo-initiator. In the dispersion according to an embodiment of the present disclosure, the volume ratio of the multifunctional compound:the colloidal particles may be 0:9:1 to 0.5:0.5, but is not limited thereto. Within such a range, the repulsion between the colloidal particles effectively works, and thus the colloidal particles can be arranged in a crystal lattice structure and have high reflectance in specific wavelengths, leading to excellent visibility and identifiability. More effectively, in terms of effectively arranging the colloidal particles in a crystal lattice structure, the volume ratio of the multifunctional compound:the colloidal particles may be more favorably 0.8:0.2 to 0.6:0.4. The photo-initiator is not particularly limited so long as a multifunctional compound can be sufficiently photo-polymerized. However, for example, the photo-initiator may be added in 0.3-3 wt % relative to the multifunctional compound, and more preferably, the addition of 0.5-2 wt % may be favorable since such an amount does not result in the lowering of the reflectance of the security device 10.

The multifunctional compound containing two or more photo-polymerizable functional groups according to an embodiment of the present disclosure is not particularly limited so long as the multifunctional compound can be photo-polymerized, help self-assembly of colloid particles after polymerization, maintain high reflection properties, and provide excellent flexibility.

According to a specific embodiment, the multifunctional compound may be a monomer containing two or more photo-polymerizable functional groups or a prepolymer containing two or more photo-polymerizable functional groups. The photo-polymerizable functional group is not particularly limited so long as the photo-polymerizable functional group can be polymerized through light irradiation, but specifically, examples thereof may be at least one selected from ethylenically unsaturated groups, such as a vinyl group, an acrylate group, or a methacrylate group.

According to a more specific embodiment, the multifunctional compound may be one or more selected from photocurable multifunctional monomers (such as ethoxylated trimethylolpropane triacrylate (ETPTA), di(trimethylolpropane) tetracrylate, glycerol propoxylate triacrylate, trimethylolpropane ethoxylate triacrylate, trimethylolpropane ethoxylate triacrylate, or trimethylolpropane ethoxylate triacrylate), polyurethane-based prepolymers, and the like.

More specifically, the polyurethane-based prepolymers may be prepared through polymerization reactions of polyisocyanate-based compounds and polyol-based compounds as long as the properties desired by the present disclosure, for example, flexibility, a refractive index, and reflectance are not adversely affected.

In an embodiment of the present disclosure, the polyisocyanate-based compounds may be one or more selected from aromatic polyisocyanates, aliphatic polyisocyanates, cycloaliphatic polyisocyanates, and the like. More specifically, for example, the aromatic polyisocyanates may be 1,3-phenylene diisocyanate, 1,4-phenylene diisocyanate, 2,4-tolylene diisocyanate (TDI), 2,6-tolylene diisocyanate, 4,4'-diphenylmethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanato diphenylmethane, 1,5-naphthalene diisocyanate, 4,4',4"-triphenylmethane triisocyanate, m-isocyanatophenylsulfonyl isocyanate, p-isocyanatophenylsulfonyl isocyanate, or the like; the aliphatic polyisocyanates may be ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethylcaproate, bis(2-isocyanatoethyl) fumarate, bis(2-isocyanatoethyl)carbonate, 2-isocyanatoethyl-2,6-diisocyanatohexanoate, or the like; and the cycloaliphatic polyisocyanates may be isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-dichlorohexene-1,2-dicarboxylate, 2,5-norbornane diisocyanate, 2,6-norbornane diisocyanate, or the like, but are not particularly limited thereto.

In an embodiment of the present disclosure, polyester polyols, polyether polyols, and mixtures thereof may be used for the polyol-based compounds, and more specifically, for example, the polyester polyols may be polyethylene adipate, polybutylene adipate, poly(1,6-hexaadipate), polydiethylene adipate, poly(e-caprolactone), or the like; and the polyether polyols may be polyethylene glycol, polydiethylene glycol, polytetramethylene glycol, polyethylene propylene glycol, or the like, but are not limited thereto.

In addition, for the multifunctional compound, ones that are in a liquid phase at an aging temperature need to be used, and preferably, ones that have a viscosity of favorably 1-1000 cps and more preferably 5-500 cps at an aging temperature may be used.

As the photo-initiator according to an embodiment of the present disclosure, any photo-initiator may be used without particular limitation so long as the photo-initiator is commonly used in the art, and specifically, for example, the photo-initiator may be one or more selected from 1-hydroxy-cyclohexyl-phenol-ketone, 2-methyl-1[4-(methylthio)phenyl]-2-morpholinopropan-1-one, benzyldimethylketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methyl propan-1-one, benzophenone, 2,2-dimethoxy-2-phenylacetphenone, 2,2-diethoxy-2-phenylacetphenone, 2-hydroxy-2-methyl-1-propan-1-one, 4,4'-diethylaminobenzophenone, dichlorobenzophenone, 2-methylanthraquinone, 2-ethylanthraquinone, 2-methylthioxanthone, 2-ethylthioxanthone, 2,4-dimethyl thioxanthone, 2,4-diethyl thioxanthone, and the like.

The aging film 300 may be preferably 10-300 μm in thickness. If the thickness of the aging film 300 is smaller than 10 μm, the aging film 300 fails to adhere flat to the colloidal crystal to protect the colloidal crystal in the aging step of the colloidal crystal, and does not sufficiently protect the colloidal crystal film from external stimulation, failing to contribute to an enhancement in durability. If the thickness of the aging film 300 is larger than 300 μm, the light transmittance of the aging film is poor, resulting in poor visibility of the manufactured security device 10, and when such an aging film is applied to a final product, the final product may have poor flexibility.

The aging film 300 is better as the light transmittance of the aging film is higher, and it is not a problem whether the surface of the aging film is glossy or matte. Especially, as for the type of the aging film 300, both photo-curable resins and thermoplastic resins may be used so long as the resins can help the self-assembly of the colloidal crystal. In addition, a transparent material in which the yellowing by light does not occur so as to maintain the quality of a colloidal crystal is suitable.

The aging film 300 may contain a hidden image therein. The hidden image can be implemented in the form of an image that appear or disappear only at a specific angle of view from the film or that is shown in a different color for each angle of view, and the hidden image enables the image of the colloidal crystal to be confirmed only at a specific angle by utilizing polarization characteristics.

In addition, the aging film 300 may be formed of the same material as the substrate, and any polymer film that has a reflectance of 90% or higher may be used without being limited to a base material.

The aging film 300 may be a release film, which is easy to separate from the colloidal crystal 200 and the substrate 100. In a case where the aging film 300 is intended to be formed of a release film, for the application of the security device 10 of the present disclosure to securities or cards, the aging film 300 can be removed and then replaced with a transparent film of the securities or cards, thereby reducing the entire thickness of the products.

Figure 3:
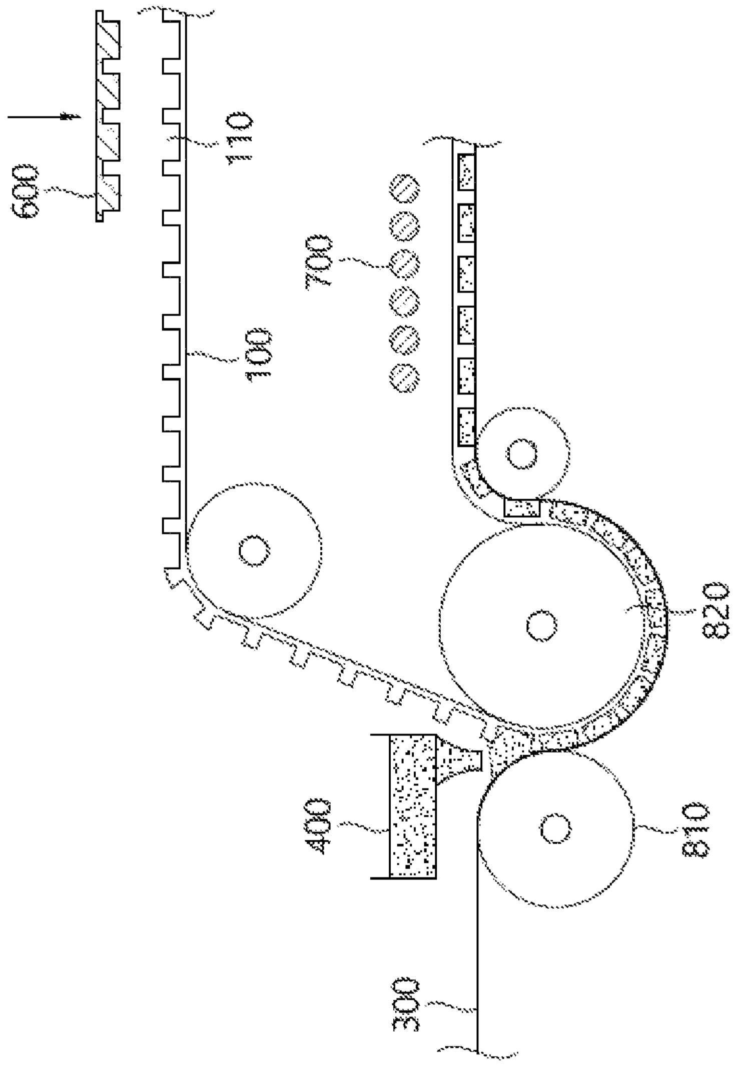
FIG. 3 shows a manufacturing process for a security device according to an embodiment of the present disclosure.

The security device 10 of the present disclosure can be manufactured through a continuous process, and FIG. 3 shows an embodiment of the security device manufactured through a continuous process. A manufacturing method for the security device 10 of the present disclosure includes:

1) supplying a substrate 100 having at least one surface in which a plurality of groove portions 110 are formed;

2) injecting a colloidal dispersion 400 such that the colloidal dispersion is disposed in the groove portions 110 of the substrate;

3) after the injecting of the colloidal dispersion 400, supplying an aging film 300 to allow the aging film 300 to adhere to at least one surface in which the groove portions 110 are formed; and 4) curing the colloidal dispersion 400.

The method may further include, before the supplying of the substrate 100, compressing a mold 600 to form the groove portions 110.

The substrate 100 and the aging film 300 each may be supplied by unwinding from a roll shape in which each has been wound.

The supplied substrate 100 may include the groove portions 110, or the groove portions 100 may be formed by press-fitting through the mold 600. After the substrate is press-fitted by the mold 600, the substrate is cured in a manner in which the substrate is subjected to heating, cooling, or ultraviolet irradiation depending on the composition of the substrate, so that the groove portions 110 are formed in the substrate. The colloidal dispersion 400 is disposed in the groove portion 110. The aging film 300 is supplied in a direction different from the direction in which the substrate is supplied. After the colloidal dispersion 400 is disposed in the groove portions 110, the aging film 300 is allowed to adhere onto the substrate such that the colloidal dispersion 400 is disposed between the substrate 100 and the aging film 300.

After the colloidal dispersion 400 is disposed in the groove portions, the groove portions are covered by the aging film 300, thereby precisely controlling the thickness of the colloidal dispersion 400, and through such a very simple procedure, the dispersion can have a film shape with a uniform thickness.

Preferably, at least any one selected from the substrate 100 and the aging film 300 transmits light, so that a multifunctional compound can be effectively photo-polymerized.

The substrate with the aging film 300 adhering thereonto is subjected to an aging step. After the colloidal dispersion 400 is disposed in the groove portions 100, the colloidal dispersion 400 is aged at a temperature of 30° C. (inclusive) to 100° C. (exclusive), so that colloidal particles can be quickly self-assembled inside a multifunctional compound matrix, and at the time of self-assembly, the colloidal particles are arranged in an extremely uniform crystal lattice structure, thereby significantly increasing the maximum reflectance of the manufactured security device 10.

The aging may mean that the applied dispersion is left at the same temperature condition for a predetermined time. The dispersion according to an embodiment of the present disclosure contains no solvent, and thus the aging is not for applying heat to remove a solvent, but for arranging the colloidal particles in an extremely precise and regular crystal lattice structure by aging the dispersion at a temperature of 30° C. (inclusive) to 100° C. (exclusive) to thereby appropriately control the viscosity of the multifunctional compound. To this end, the aging temperature is more important before anything, and more preferably, the aging step is favorably performed at 40° C. to 70° C. Within such a range, a crystal lattice structure in which colloidal particles are highly precisely and regularly arranged can be formed, and therefore, the manufactured security device 10 has higher reflectance, thereby exhibiting excellent visibility. On the other hand, if the aging temperature is too low, for example, lower than 30° C., the precision of the crystal lattice structure of the colloidal particles may be somewhat degraded, and if the aging temperature is higher than 100° C., the dispersion may boil to generate bubbles and the polymer resin may be yellowed. Moreover, such problems may degrade the regularity of the crystal lattice structure of the colloidal particles.

In addition, the aging step is favorably performed for a predetermined time, and specifically, for example, the aging may be performed for 1 minute or more. If the aging is performed for less than 1 minute, the precision of the crystal lattice structure of the colloidal particles may be somewhat degraded, and thereafter, at the time of light irradiation, the maximum reflectance of the manufactured security device 10 may be lowered. Preferably, in terms of significantly increasing the maximum reflectance of the manufactured security device 10, the aging step is preferably performed for favorably 20 minutes and more and more favorably 30 minutes or more, and the aging time is preferably differently controlled depending on the aging temperature. The upper limit of the aging time is not particularly limited, but as the maximum reflectance is not further increased even though the aging is performed even for a predetermined time or more, performing the aging for more than the predetermined time may be a waste of time and may cause partial thermal polymerization of the multifunctional compound. Specifically, the upper limit of the aging time may be 24 hours or less, but in terms of shortening the manufacturing time, the aging step may be preferably performed for 120 minutes or less.

In the substrate 100 subjected to the aging step, the colloidal dispersion 400 is cured by a UV lamp 700 to form a colloidal crystal. The light irradiated from the UV lamp may be, but not limited to, a light having a wavelength region of 200-500 nm, more preferably a light having a wavelength region of 254-400 nm, and more favorably a light having a wavelength region of 330-370 nm, and may be a light which is a mixture of lights of several wavelength bands or a light of a single wavelength band.

In an embodiment of the present disclosure, the conditions of light irradiation may be differently controlled depending on the size or the like of the security device 10, and it is a matter of course that the light irradiation can be performed until the dispersion containing a multifunctional compound is sufficiently cured. According to a non-limiting embodiment, the light irradiation may be performed by applying a light with an output of 5-20 mW/cd for 3-30 seconds, and more preferably a light with an output of 7-15 mW/cd for 5-10 seconds, but is not necessarily limited thereto.

After the curing of the colloidal dispersion, the aging film 300 may be removed according to the applied product.

When the security device 100 is manufactured by a continuous process as described above, the manufacturing time can be significantly reduced and efficient production can be attained. In particular, unlike an existing method in which enormous time was taken in a process in which a dispersion is injected between two transparent substrates by using capillary force, the security device 10 of the present disclosure can be manufactured in a very simple method of merely applying a dispersion on one substrate and then placing another substrate thereon, so that the time required for film manufacturing can be greatly reduced and thus the manufacturing efficiency can be greatly improved.

The colloidal crystal exhibits various light reflection properties by the size of particles, the type of a matrix mixture, process conditions, and the like, and thus the colloidal crystal is difficult to duplicate, leading to excellent security. Therefore, the security device 10 of the present disclosure can be applied to securities, credit cards, security cards, anti-counterfeit products, and the like.

The present disclosure has been described with reference to the embodiments, but these are intended to be merely illustrative, and a person skilled in the art will understand that various modifications and other equivalent embodiments can be derived therefrom. Accordingly, the true scope of protection of the present disclosure should be defined based on the appended claims.

The invention claimed is:

1. A security device using light reflection properties, the security device comprising:

a substrate comprising groove portions in a surface of the substrate;

a colloidal crystal contained in at least a portion of each of the groove portions; and an aging film covering at least a portion of the surface of the substrate containing the colloidal crystal, wherein a shape of the groove portions formed in an upper portion of the substrate is the same as that of the groove portions formed in a lower portion of the substrate.

2. The security device of claim 1, wherein the substrate comprises a thermoplastic resin, an ultraviolet-curable resin, or both.

3. The security device of claim 2, wherein the thermoplastic resin comprises at least one material selected from the group consisting of acetals, fluorocarbons, polyimides, polycarbonates, polyesters, polyethylene, polyacrylates, polystyrenes, polypropylenes, and polyvinyl alcohols.

4. The security device of claim 2, wherein the ultraviolet-curable resin comprises at least one material selected from a group consisting of unsaturated polyester resins, polyester acrylate resins, polyurethane acrylate resins, and epoxy acrylate resins.

5. The security device of claim 1, wherein the substrate is a flexible substrate.

6. The security device of claim 1, wherein the colloidal crystal comprises spherical particles comprising at least one material selected from a group consisting of silica, titanium dioxide, polystyrenes, and polymethacrylates and having a monodispersity of 7% or less, and wherein the spherical particles have an average particle size of 50-300 nm.

7. The security device of claim 1, wherein the aging film has a thickness of 10-300 μm.

8. The security device of claim 1, wherein a space between neighboring groove portions is 0.1 μm to 50 mm and a depth of the groove portion is 10-200 μm.

9. The security device of claim 1, wherein the aging film is a release film which is easy to separate from a thermoplastic resin film and the colloidal crystal.

* * * * *